US 10,500,550 B2

(12) United States Patent
Geibel

(10) Patent No.: US 10,500,550 B2
(45) Date of Patent: Dec. 10, 2019

(54) STATIC MIXER

(75) Inventor: Andreas Geibel, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 669 days.

(21) Appl. No.: 13/524,372

(22) Filed: Jun. 15, 2012

(65) Prior Publication Data

US 2012/0320708 A1  Dec. 20, 2012

(30) Foreign Application Priority Data

Jun. 16, 2011  (DE) .................. 10 2011 077 645

(51) Int. Cl.
*B01F 3/04* (2006.01)
*B01F 5/04* (2006.01)
*B01F 5/06* (2006.01)
*F01N 3/20* (2006.01)
*F01N 3/28* (2006.01)

(52) U.S. Cl.
CPC ........ *B01F 3/04049* (2013.01); *B01F 5/0451* (2013.01); *B01F 5/0616* (2013.01); *F01N 3/2073* (2013.01); *F01N 3/2892* (2013.01); *B01F 2005/0639* (2013.01); *F01N 2240/20* (2013.01); *Y02A 50/2325* (2018.01)

(58) Field of Classification Search
CPC .. F01N 3/2892; F01N 3/2073; F01N 2240/20; B01F 3/04049; B01F 5/0451; B01F 5/0616; B01F 2005/0639; Y02A 50/2325
USPC ................................................. 366/336–340
See application file for complete search history.

(56) References Cited

U.S. PATENT DOCUMENTS

| 2,685,504 A | | 8/1954 | Ulbing | |
|---|---|---|---|---|
| 2,690,193 A | * | 9/1954 | Smith | F16L 55/172 138/99 |
| 2,882,780 A | * | 4/1959 | Edwards | F16B 19/1081 411/337 |
| 3,095,337 A | * | 6/1963 | Chase | F16L 59/024 138/155 |
| 3,273,601 A | | 9/1966 | Gain | |
| 3,751,009 A | * | 8/1973 | Archer | B01F 5/0619 366/337 |
| 3,898,495 A | * | 8/1975 | Livera | H01J 5/565 264/334 |

(Continued)

FOREIGN PATENT DOCUMENTS

| DE | 2006017 A1 | 11/1970 |
|---|---|---|
| DE | 10 2007 012790 A1 | 9/2008 |

(Continued)

*Primary Examiner* — Anshu Bhatia
(74) *Attorney, Agent, or Firm* — Reinhart Boerner Van Deuren P.C.

(57) ABSTRACT

The present invention relates to a static mixer (9) for installation in a fluid line, in particular exhaust line (5) of a combustion engine (1), with an annular body (10) comprising at least one blade row (11) with a plurality of guide blades (12) standing away from the annular body (10) to the inside.

A cost-effective producibility is obtained when the annular body (10) in the circumferential direction (13) consists of at least two part bodies (14), when part bodies (14) adjacent in the circumferential direction (13) are fastened to one another and when each part body (14) comprises a plurality of guide blades (12).

14 Claims, 3 Drawing Sheets

(56) References Cited

U.S. PATENT DOCUMENTS

| | | | | |
|---|---|---|---|---|
| 4,298,554 | A | * | 11/1981 | Vogel .................. C04B 28/26 106/38.3 |
| 4,316,673 | A | * | 2/1982 | Speer .................. B01F 5/0609 366/337 |
| 4,761,863 | A | * | 8/1988 | Sugihara ............ A44B 17/0035 24/113 MP |
| 4,848,920 | A | * | 7/1989 | Heathe et al. ................. 366/339 |
| 5,489,154 | A | * | 2/1996 | Algreen-Ussing ............ 366/338 |
| 5,944,419 | A | * | 8/1999 | Streiff ............................ 366/337 |
| D414,191 | S | * | 9/1999 | Kim ................................. D15/5 |
| 6,109,781 | A | | 8/2000 | Ogasawara et al. |
| 6,536,420 | B1 | * | 3/2003 | Cheng ............................ 123/590 |
| 6,595,395 | B2 | * | 7/2003 | Jourdin ................ B65D 83/38 222/321.9 |
| RE200,803 | | | 12/2008 | Wirth et al. |
| 7,908,845 | B2 | * | 3/2011 | Brown et al. ................... 60/286 |
| 2002/0001257 | A1 | * | 1/2002 | Koch .................. B01F 5/0617 366/337 |
| 2004/0130967 | A1 | * | 7/2004 | Wolf et al. ..................... 366/340 |
| 2006/0162690 | A1 | | 7/2006 | Kim |
| 2007/0205523 | A1 | * | 9/2007 | Kojima ........................ 261/79.2 |
| 2008/0250776 | A1 | * | 10/2008 | Brown et al. ................... 60/299 |
| 2008/0267780 | A1 | * | 10/2008 | Wirth ........................ 416/204 A |
| 2009/0320453 | A1 | * | 12/2009 | Salanta et al. ................... 60/282 |
| 2010/0107617 | A1 | * | 5/2010 | Kaiser et al. ................... 60/324 |
| 2010/0218490 | A1 | * | 9/2010 | Forster et al. ................... 60/324 |
| 2010/0263359 | A1 | | 10/2010 | Haverkamp et al. |
| 2010/0293931 | A1 | * | 11/2010 | Peters et al. ..................... 60/324 |
| 2011/0016856 | A1 | * | 1/2011 | Wirth .............................. 60/317 |
| 2011/0094206 | A1 | | 4/2011 | Liu et al. |
| 2011/0113764 | A1 | * | 5/2011 | Salanta et al. ................... 60/303 |
| 2011/0258983 | A1 | * | 10/2011 | Vosz ............................... 60/274 |
| 2011/0283686 | A1 | * | 11/2011 | Jebasinski ........... B01F 3/04049 60/295 |
| 2012/0255278 | A1 | * | 10/2012 | Miao et al. ..................... 60/274 |

FOREIGN PATENT DOCUMENTS

| | | |
|---|---|---|
| DE | 10 2008 017 395 A1 | 10/2009 |
| DE | 10 2008 026 724 A1 | 12/2009 |
| DE | 10 2008 029 110 A1 | 12/2009 |
| DE | 10 2008 053 106 A1 | 4/2010 |
| DE | 10 2008 053106 A1 | 4/2010 |
| EP | 1686249 A2 | 8/2006 |
| EP | 2278133 A2 | 1/2011 |
| JP | 2002-523228 A | 7/2002 |
| JP | 2008-223345 A | 9/2008 |
| JP | 2010-221084 A | 10/2010 |
| JP | 2008274941 A | 11/2013 |

* cited by examiner

STATIC MIXER

CROSS-REFERENCE TO RELATED PATENT APPLICATIONS

This patent application claims priority to German Patent Application No. 102011077645.1, filed Jun. 16, 2011, the entire teachings and disclosure of which are incorporated herein by reference thereto.

FIELD OF THE INVENTION

The present invention relates to a static mixer for installation in a fluid line, in particular for installation in an exhaust line of a combustion engine, with the features of the preamble of Claim 1. The invention additionally relates to an exhaust system for a combustion engine, in particular of a motor vehicle, which is equipped with at least one such mixer.

BACKGROUND OF THE INVENTION

Modern exhaust systems of combustion engines can be equipped with an SCR-system, in order to reduce the NOX-emissions. Such an SCR-system comprises a reduction agent feeding device, with the help of which a suitable reduction agent, such as for example aqueous urea solution can be introduced into an exhaust gas stream. Furthermore, an SCR-catalytic converter is arranged downstream of the reduction agent feeding device, which reduces nitric oxides to water by means of ammonia. In order to make it possible that this reduction in the SCR-catalytic converter can duly proceed, the reduction agent introduced in liquid form has to be largely evaporated up to the SCR-catalytic converter and intermixed with the exhaust gas stream as homogeneously as possible. In particular, this mixing section, which designates the distance from the reduction agent feeding device to the SCR-catalytic converter, can also be utilized in order to convert the urea introduced in aqueous solution into ammonia and carbon dioxide by means of hydrolysis reaction. To this end, a thermolysis, during which the urea is converted into ammonia and isocyanic acid initially takes place. The actual hydrolysis, during which the isocyanic acid is converted into ammonia and carbon dioxide by means of water, takes place after this.

In order to improve the homogenization, the evaporation and if applicable the hydrolysis it is known to arrange at least one static mixer in said mixing section.

From DE 2 006 017 A2 a static mixer is known, which consists of an annular body, which comprises a blade row with a plurality of guide blades standing away from the annular body towards the inside. With the known mixer, the annular body together with the guide blades is formed by a shaped sheet metal part, which is produced from a single sheet metal body through forming. To this end, a blank in the form of a flat sheet metal body is initially multiply incised in order to cut the guide blades clear. Following this, the guide blades are angled off from the rest of the sheet metal body. After this, the sheet metal body with angled-off guide blades is bent about an axis running transversely to its longitudinal direction until the circumferential ends meet. The production thus takes place in multiple steps, which is comparatively expensive, at least time-consuming.

The present invention deals with the problem of stating an improved or at least a different embodiment for a static mixer of the type mentioned above, which is characterized in particular by an economical producibility. According to the invention, this problem is solved through the subjects of the independent claims. Advantageous embodiments are the subject of the dependent claims.

BRIEF SUMMARY OF THE INVENTION

The invention is based on the general idea of assembling the annular body in the circumferential direction from at least two part bodies, wherein each part body comprises a plurality of guide blades. It has been shown that the part bodies with guide blades can be produced from blanks in the shape of flat sheet metal bodies through a single forming operation, during which within a single tool the guide blades are cut clear and angled off, while the sheet metal body at the same time is also bent about a bending axis running transversely to its longitudinal direction, in order to thus produce the respective part body, which corresponds to a circumferential segment of the annular body, in a single production step. With an annular body, which extends over 360° in a closed manner, such complex forming cannot be carried out in a single operation. Although a plurality of individual parts, namely the individual part bodies, have to be produced and fastened to one another for producing the mixer, it has been shown in a surprising manner that the production of this multi-part mixer in this manner is more cost-effective altogether than the known procedure, during which the annular body with the guide blades is produced from a single sheet metal body.

Practically, the annular body is assembled from two to four part bodies. An embodiment, wherein the annular body is assembled from three part bodies, has proved to be particularly advantageous.

According to another embodiment, the part bodies adjacent in circumferential direction can engage into one another in the region of their circumferential ends and be pressed together with one another. Because of this, the adjacent part bodies are positively interconnected without expensive material-joining connection measures, such as for example soldering and welding, having to be carried out. Possible fastening methods are for example penetration joining, clinching and crimping.

Practically, the part bodies adjacent in circumferential direction can be arranged abutting with their circumferential ends. In other words, the circumferential ends of the part bodies adjacent in circumferential direction abut one another in the circumferential direction. Because of this, the annular body is a flat construction even in the transition region between two adjacent part bodies. In particular, the annular body has a wall thickness that remains the same in the circumferential direction.

According to a particularly advantageous embodiment, each part body can comprise at least one coupling protrusion standing away in circumferential direction at the one circumferential end and at least one coupling receptacle complementary thereto at the other circumferential end. For connecting part bodies adjacent in circumferential direction, the at least one coupling protrusion of the one part body can now be brought into engagement with the at least one coupling receptacle of the other part body. The coupling protrusions and the coupling receptacles can be integrally formed on the part bodies, so that the provision of these coupling elements does not mean any additional costs.

According to an advantageous further development, coupling protrusion and coupling receptacle can be formed for forming a positive connection, in particular for forming an undercut in circumferential direction. By means of this, the part bodies can be fixed to one another in a particularly simple manner. For example, coupling protrusion and coupling receptacle can be configured like the coupling elements of puzzle pieces, so that they can be easily brought into engagement with one another, for example manually.

Particularly practical is a further development, wherein the abutting circumferential ends in the region of the inter-engaging coupling protrusions and coupling receptacle are radially pressed together. By means of this, a specific deformation can be created in the region of the inter-engaging coupling protrusions. Through this pressing together or deformation, the coupling protrusions and the coupling receptacles are permanently clamped together in the circumferential direction and in the axial direction, as a result of which a sufficiently strong connection between the adjacent part bodies materializes.

Particularly practical is an embodiment, wherein the part bodies are identical part. Thus, the annular body ultimately consists of two or a plurality of identical part bodies, which are arranged adjoining one another in circumferential direction and are thus interconnected. Through the use of identical parts, the manufacturing costs for the individual parts can be reduced. Insofar as exactly two part bodies are used for producing the annular body, each part body extends over 180° in the circumferential direction. Insofar as exactly three part bodies are used for producing the annular body, each part body extends over 120° in the circumferential direction. In the case of four or more part bodies, corresponding circumferential sections will then result.

Particularly practical is an embodiment, wherein the respective guide blade row is arranged on the annular body at the axial face end. Thus, the respective guide blade row, in which the guide blades are adjacent in the circumferential direction, is located at the onflow end or on the outflow end of the mixer or of the annular body.

Particularly advantageous, now, is a further development, wherein the annular body comprises a blade row each on both axial face ends. In other words, the mixer comprises a blade row both on the onflow side and the outflow side with guide blades adjacent in circumferential direction. Because of the structure of the annular body divided in the circumferential direction, the respective part body thus also comprises a plurality of guide blades on the onflow side and a plurality of guide blades on the outflow side.

By using two blade rows, the mixing effect of the mixer can be significantly improved.

Relative to the arriving exhaust gas flow, the guide blades can have an angulation so that they deflect the arriving exhaust gas flow to a greater or lesser degree in circumferential direction. Practically, all guide blades within the same blade row have the same angulation relative to the exhaust gas flow, so that the through-flow of the blade row leads to a swirl in the exhaust gas flow. The flow direction of the exhaust gas in this case corresponds to the axial direction of the mixer. Insofar as only two blade rows are provided, the guide blades of both blade rows can be angled in the same direction relative to the exhaust gas flow, so that the blade row on the outflow side amplifies the swirl generated with the help of the blade row on the onflow side. It is likewise possible to angulate the guide blades of the two blade rows in the direction opposite to the exhaust gas flow. As a consequence, the blade row on the outflow side reduces or eliminates the swirl generated with the help of the blade row on the onflow side. Because of this, a particularly intensive intermixing can be realized.

According to another embodiment, the respective part body can comprise at least one radial through-opening between the axial face ends of the annular body. With the help of such a through-opening, a fixing of the part body for example within the forming tool can be carried out in a particularly simple manner. Furthermore, this through-opening can also be used to fix the part body in an exhaust pipe. For example, a weld seam can be particularly easily produced in the region of the through-opening.

With a further embodiment, the guide blades can be arranged in a contactless manner relative to one another in the respective blade row. By means of this, any contact between blades of the same blade row is avoided, which prevents a noise development in the event of vibrations.

Particularly practically, a plurality of guide blades in the respective blade row, preferentially with each part body, can end radially inside on a circular core zone, while at least one guide blade protrudes as far as into this core zone. Through this design it can be achieved on the one hand that the blade row can be configured almost opaque in the axial direction, so that in particular any droplet penetration can be avoided. In that not all guide blades protrude into the core zone, a version can also be realized wherein the guide blades do not touch one another.

In principle, the guide blades can be attached to the respective part body. However, an embodiment, wherein each part body with its guide blades is integrally produced from one piece, is preferred.

A particularly cost-effective producibility can be achieved in that each part body with its guide blades is a shaped sheet metal part, which is produced from a single sheet metal body through forming.

A method according to the invention for producing the mixer in this case is characterized in that blanks, which are formed by flat sheet metal pieces, are each formed in a single forming tool into part bodies curved in the manner of a circular arc with guide blades standing away therefrom. The part bodies in this case are end-formed and are of the off-tool type.

An exhaust system for a combustion engine according to the invention, in particular of a motor vehicle, comprises an exhaust line, in which at least one static mixer of the type described above is arranged. Downstream of this mixer, the exhaust system can comprise a reduction agent feeding device. Downstream of the mixer, the exhaust system can be equipped with an SCR-catalytic converter.

Further important features and advantages of the invention are obtained from the subclaims, from the drawings and from the associated Figure description by means of the drawings.

It is to be understood that the features mentioned above and still to be explained in the following cannot only be used in the respective combination stated but also in other combinations or by themselves without leaving the scope of the present invention.

BRIEF DESCRIPTION OF THE DRAWINGS

Preferred exemplary embodiments of the invention are shown in the drawings and will be explained in more detail in the following description, wherein same reference characters refer to same or similar or functionally same components.

It shows, in each case schematically.

DETAILED DESCRIPTION

Figure 1:
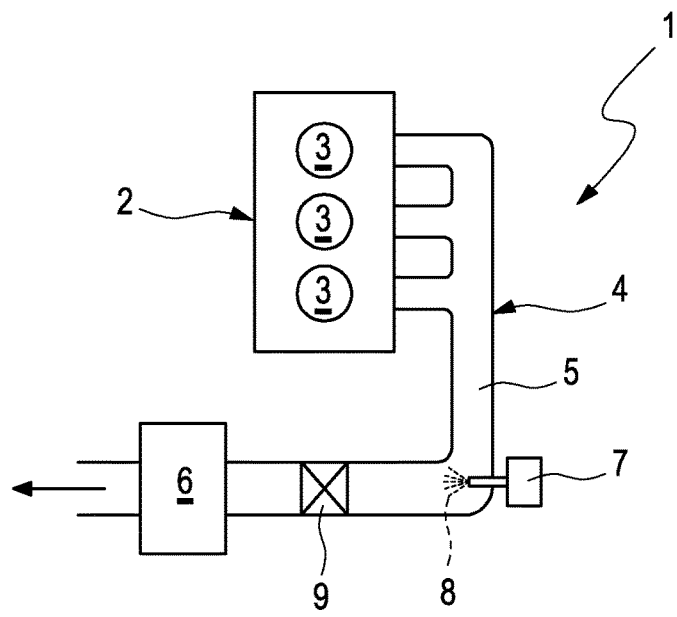
FIG. 1 a highly simplified circuit diagram-like schematic representation of a combustion engine, FIG. 2 an isometric view of a mixer, FIG. 3 an axial view of the mixer, FIG. 4 an isometric view of a part body, FIG. 5 another isometric view of the part body.

According to FIG. 1, a combustion engine 1 comprises an engine block 2 with a plurality of combustion chambers 3 and an exhaust system 4 for discharging exhaust gases from the combustion chambers 3. The exhaust system 4 comprises an exhaust line 5, in which an SCR-catalytic converter 6 is arranged. Upstream of the SCR-catalytic converter 6 a reduction agent feeding device 7 is connected to the exhaust line 5, with the help of which a reduction agent 8, for example aqueous urea solution can be introduced in the exhaust gas flow conducted in the exhaust line 5. Between the reduction agent feeding device 7 and the SCR-catalytic converter 6, a static mixer 9 is arranged in the exhaust line 5.

The mixer 9, according to the FIGS. 2 to 5, comprises an annular body 10 comprising at least one blade row 11, wherein each blade row 11 comprises a plurality of guide blades 12 standing away from the annular body 10 to the inside.

Figure 3:
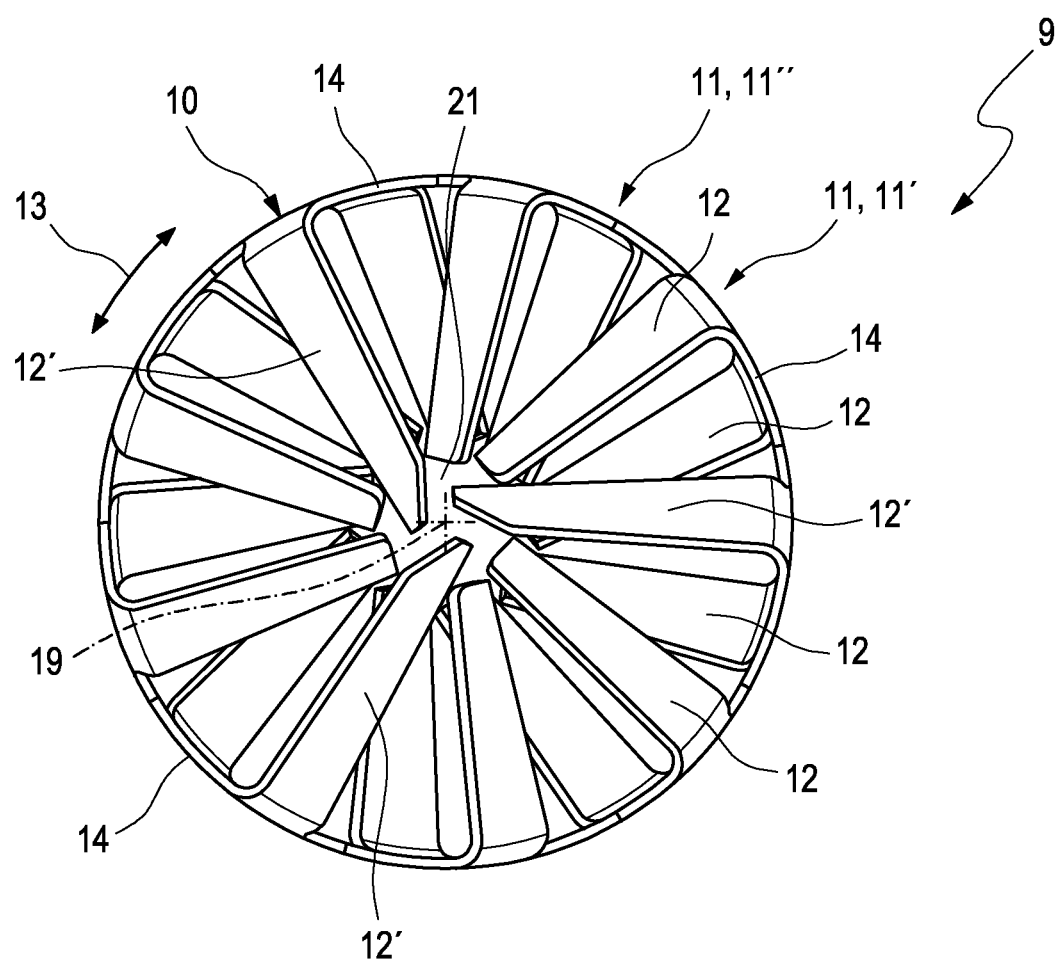

With the mixer 9 introduced here, the annular body 10 consists of at least two part bodies 14 in the circumferential direction, which in FIG. 3 is indicated by a double arrow and designated 13, each of which comprises a plurality of guide blades 12. Furthermore, part bodies 14 adjacent in the circumferential direction 13 are fastened to one another. In other words, the annular body 10 is assembled from a plurality of part bodies 14, which join one another in the circumferential direction 13.

With the example shown here, exactly three such part bodies 14 are required, each of which extend over approximately 120° in the circumferential direction 13.

Figure 5:
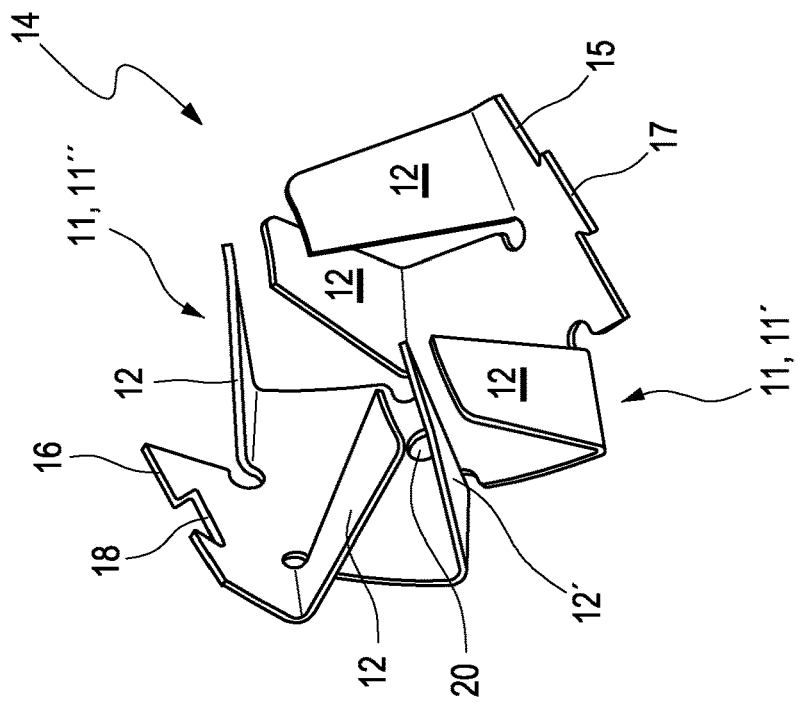
Figure 4:
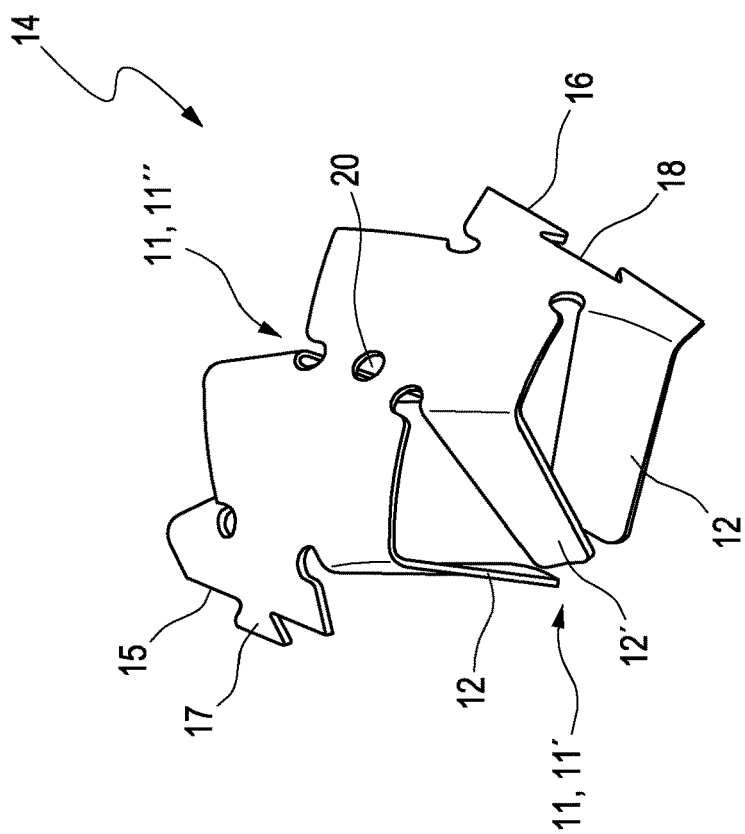

According to FIGS. 4 and 5, the guide blades 12 are integrally formed on the respective part body 14, so that the respective part body 14 together with its guide blades 12 is produced from one piece. Particularly practically, the respective part body 14 together with its guide blades 12 in this case is a shaped sheet metal part, which is produced from a single sheet metal body through forming.

For fastening the part bodies 14 adjacent in circumferential direction 13, the part bodies 14 can be configured so that they engage into one another in the region of their circumferential ends 15, 16 and are pressed together. To this end, the circumferential ends 15, 16 can be arranged abutted such that they only bear against one another in the circumferential direction 13, without radially overlapping or covering one another. Because of this, a wall thickness that is continuously constant in circumferential direction 13 can be guaranteed for the annular body 10.

With the particularly advantageous embodiment introduced here, the respective part body 14 comprises a coupling protrusion 17 standing away in the circumferential direction 13 on the one circumferential end 15 and a coupling receptacle 18 that is complementary to the coupling protrusion 17 on the other circumferential end 16. As is evident, in particular, from FIG. 2, the coupling protrusion 17 of the one part body 14 and the coupling receptacle 18 of the other part body 14 are in engagement with each other for connecting part bodies 14 adjacent in circumferential direction 13. Practically, coupling protrusion 17 and coupling receptacle 18 in this case are shaped so that a positive connection can be established here. In the example, this is achieved through an undercut with respect to the circumferential direction on the coupling protrusion 17 and in the coupling receptacle 18. For example, the coupling protrusion 17 expands with increasing distance from the associated circumferential end 15. Complementary thereto, the coupling receptacle 18 tapers in direction of the associated circumferential end 16. Coupling protrusion 17 and coupling receptacle 18 in this case can be formed in particular like the coupling elements of puzzle pieces and interact with one another. For assembling the annular body 10, the individual part bodies 14 are started relative to one another in such a manner that the coupling protrusions 17 engage in the associated coupling receptacles 18. Following this, radial pressing together can be carried out in the region of the inter-engaging coupling protrusions 17 and coupling receptacles 18, during which the coupling protrusions 17 are expanded in the circumferential direction 13 and axially, i.e. parallel to a longitudinal center axis 19 of the mixer 9 or of the annular body 10 indicated in FIG. 3 and are plastically deformed in the process. The individual part bodies 14 are subsequently interconnected in a sufficiently fixed manner, as a result of which the annular body 10 and thus the mixer 9 can be manipulated or handled easily in order to be mounted for example in the exhaust line 5.

Practically, the part bodies 14 are identical parts, so that in the present case three identical part bodies 14 can be assembled into the annular body 10.

With the preferred example introduced here, the annular body 10 comprises two blade rows 11, each of which are arranged on the annular body 10 at the axial face end. Mounting the mixer 9 in the exhaust line 5 is carried out such that the longitudinal center axis 19 of the annular body 10 extends parallel to the main flow direction of the exhaust gas in the exhaust line 5. Practically, the annular body 10 in this case is positioned coaxially to the respective exhaust line 5. Accordingly, the two blade rows 11 can also be called blade row 11' on the onflow side and blade row 11" on the outflow side.

The individual part bodies 14 are then likewise practically equipped for each blade row 11 with a plurality of guide blades 12.

With respect to the onflow direction of the exhaust gas, the guide blades 12 have an angle of attack or an angulation. Within the same blade row 11, the angulation of the associated guide blades 12 in this case is identical. Thus, the through-flow of the blade row 11 can impart a swirl on the exhaust gas flow. In the shown example, the guide blades 12 of both blade rows 11 have angulations in the same direction, as a result of which the blade row 11" on the outflow side amplifies the swirl of the blade row 11' on the onflow side.

Figure 2:
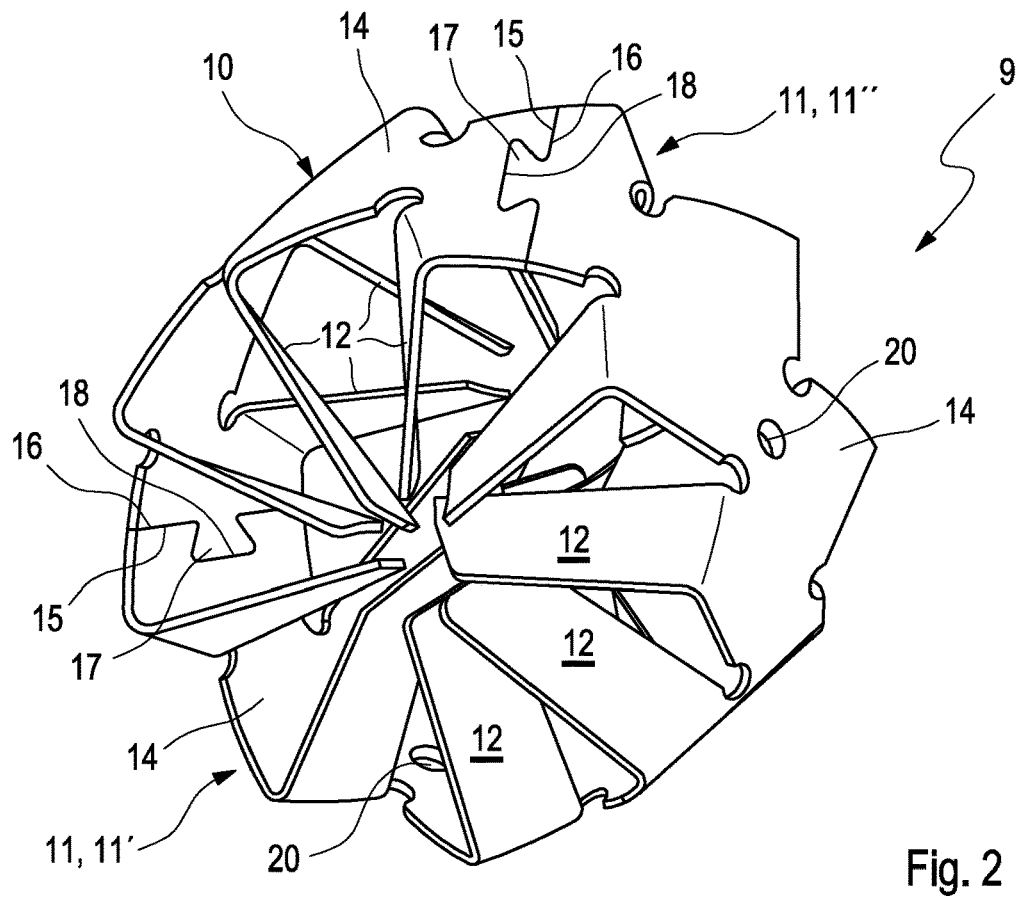

As is evident from the FIGS. 2, 4 and 5, the respective part body 14 can comprise at least one radial through-opening 20, which is arranged between the axial face ends of the annular body 10. The through-opening 20 can for example be used during the production of the respective part body 14 for fixing the sheet metal body serving as blank in an associated forming tool. Furthermore, during the course of the mounting of the mixer 9 in the exhaust line 5, a fixing of the respective part body 14 and thus of the entire annular body 10 on the exhaust line 5 can take place in the region of this through-opening.

As is evident, in particular, from the FIGS. 2 to 5, the guide blades 12 are arranged within the respective blade row 11 so that they do not touch one another. Furthermore, a circular core zone 21 is evident in FIG. 3. This core zone 21 is formed in that within the respective blade row 11 a plurality of guide blades 12 terminate on this core zone 21 radially inside in such a manner that the core zone 21 remains substantially clear. By this it is achieved in particular that the guide blades 12 do not touch one another. In the shown example, the blade row 11' on the onflow side comprises a plurality of guide blades 12', which are longer than the other guide blades 12 and accordingly protrude as far as into the core zone 21. Because of this, the cross section that can be subjected to a free through-flow can also be reduced in the region of the core zone 21. Since not all guide blades 12, but only few guide blades 12' protrude into the core zone 21, contactless positioning or a clear arrangement can also be arranged for these guide blades 12'.

In the shown example, only the blade row 11' on the onflow side has such longer guide blades 12', which protrude as far as into the core zone 21. In the case of the blade row 11" on the outflow side, all guide blades 12 are identical in length and end at the core zone 21. Accordingly, the respective part body 14 each comprises at least one longer such guide blade 12'.

With another embodiment, even both blade rows 11 can be equipped with such longer guide blades 12'. With another embodiment, it can also be provided that only the blade row 11" on the outflow side comprises such longer guide blades 12'.

The production of the mixer 9 is carried out in such a manner that the part bodies 14 with the guide blades 12 are end-formed in a forming tool in an off-tool manner from blanks, which are formed by flat sheet metal bodies, in particular in a single forming operation. Following this, a plurality of part bodies 14 are assembled into the annular body 10 and fastened to one another in the region of their circumferential ends 15, 16. For example, in that the abutting circumferential ends 15, 16 are radially pressed together in the region of the inter-engaging coupling protrusions 17 and coupling receptacles 18. Following this, the annular body 10 or the mixer 9 is completed and can be installed in the exhaust line 5.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A static mixer for installation in an exhaust line of a combustion engine, with an annular body, comprising at least one blade row with a plurality of guide blades standing away from the annular body to an inside,
wherein,
the annular body defines an outer periphery of the static mixer and in a circumferential direction consists of at least two part bodies,
part bodies adjacent in the circumferential direction are fastened to one another,
each part body comprises a plurality of guide blades;
wherein, the part bodies adjacent in the circumferential direction inter-engage into one another in a protrusion-receptacle configuration in a region of circumferential ends of the part bodies and are pressed together in the region of the circumferential ends with plastic deformation; and
wherein, the part bodies adjacent in the circumferential direction are arranged in the circumferential direction abutting with their circumferential ends;
wherein the region of circumferential ends is on the outer periphery; and
wherein the plurality of guide blades are formed at an axial extent of the annular body and radially converge to a central region of the annular body.

2. The mixer according to claim 1,
wherein,
each part body on a one circumferential end comprises at least one coupling protrusion standing away in the circumferential direction and on an other circumferential end at least one coupling receptacle complementary thereto, wherein four connecting part bodies are fastened to one another and adjacent in the circumferential direction such that the at least one coupling protrusion of one part body is in engagement with the at least one coupling receptacle of the other part body.

3. The mixer according to claim 2,
wherein,
coupling protrusion and coupling receptacle are formed for forming a positive connection, in the form of an undercut, in the circumferential direction.

4. The mixer according to claim 2,
wherein,
the abutting circumferential ends are radially pressed together in a region of the inter-engaging coupling protrusion and coupling receptacle.

5. The mixer according to claim 1,
wherein,
the part bodies are identical parts.

6. The mixer according to claim 1,
wherein,
the at least one blade row is arranged on the annular body axially at a first face end.

7. The mixer according to claim 6,
wherein, the annular body comprises a second face end; and wherein
the annular body comprises a blade row each on both first and second face ends.

8. The mixer according to claim 7,
wherein,
the annular body comprises a radial through-opening between both first and second face ends.

9. The mixer according to claim 1,
wherein,
the guide blades of the at least one blade row are arranged in a contactless manner relative to one another.

10. The mixer according to claim 1,
wherein,
at least in one such blade row a plurality of guide blades terminate on a circular core zone radially inside, while at least one guide blade protrudes as far as into the core zone.

11. The mixer according to claim 1,
wherein,
each part body with its guide blades is integrally produced from one piece.

12. The mixer according to claim 1,
wherein,
each part body with its guide blades is a shaped sheet metal part produced from a single sheet metal body through forming.

13. An exhaust system for a combustion engine of a motor vehicle with an exhaust line, in which at least one static mixer according to claim 1 is arranged.

14. A static mixer for installation in an exhaust line of a combustion engine the static mixer comprising:
- an annular body having an outer most annular wall defining an outer periphery of the static mixer and defined by at least two part bodies fastened to one another, each part body comprising at least one blade row with multiple guide blades standing away from the annular wall to an inside;
- wherein the part bodies each have circumferential ends;
- wherein adjacent part bodies engage one another in a protrusion-receptacle configuration and are pressed fit at their circumferential ends along the annular wall with plastic deformation;
- wherein the adjacent part bodies engage one another on the outer periphery; and
- wherein the multiple guide blades are formed at an axial extent of the annular body and radially converge to a central region of the annular body.

* * * * *